United States Patent
Klumb et al.

[11] Patent Number: 6,099,972
[45] Date of Patent: Aug. 8, 2000

[54] FABRIC-FREE BELT

[75] Inventors: Werner Klumb, Lörrach, Germany; Burghardt Schmidt, Dornach, Switzerland

[73] Assignee: Habasit AG, Reinach, Switzerland

[21] Appl. No.: 09/077,404

[22] PCT Filed: Dec. 3, 1996

[86] PCT No.: PCT/CH96/00425

§ 371 Date: May 28, 1989

§ 102(e) Date: May 28, 1998

[87] PCT Pub. No.: WO97/21938

PCT Pub. Date: Jun. 19, 1997

[30] Foreign Application Priority Data

Dec. 13, 1995 [CH] Switzerland .............................. 3520/95

[51] Int. Cl.[7] .................................. B32B 27/08; B05D 5/10
[52] U.S. Cl. ...................................... 428/474.4; 428/474.7; 427/207.1; 427/208; 427/208.2; 427/208.4; 427/393.5

[58] Field of Search ................................ 478/474.4, 474.7; 427/207.1, 208, 208.2, 208.4, 393.5

[56] References Cited

FOREIGN PATENT DOCUMENTS

| 2114746 | 10/1971 | Germany . |
| 4039584 | 6/1992 | Germany . |
| 604137 | 4/1960 | Italy . |

*Primary Examiner*—Leszek Kiliman
*Attorney, Agent, or Firm*—Selitto & Associates, P.C.

[57] ABSTRACT

A fabric-free belt has an oriented polyamide layer (1) as a tension layer. A rubber layer (2, 3) is arranged in the form of a laminate on both sides of the oriented polyamide layer (1). The rubber layers (2, 3) contain at least 1 part by weight, based on 100 parts by weight of rubber, of resorcinol, phenol, cresols or mixtures thereof and adhere directly to the oriented polyamide layer (1). An advantage of the invention is that no adhesion promoter coating has to be applied to the polyamide layer (1) or to the rubber layers (2, 3) for the production of the laminate.

19 Claims, 1 Drawing Sheet

FABRIC-FREE BELT

FIELD OF THE INVENTION

The invention relates to a fabric-free belt having an oriented polyamide layer as a tension layer to a process for the production of such a fabric-free belt.

BACKGROUND OF THE INVENTION

Belts which have high tensile strength and have been used to date usually as, inter alia, drive belts or conveyor belts, contain a sheet as a tension layer, which is surrounded on both sides by a fabric provided with an adhesion promoter layer, each having a rubber friction layer arranged thereon. The fabric performs the function of mechanical stabilization of the tension layer and is an important connecting element for the rubber friction layer and the tension layer. In some cases, such belts transmit or absorb large forces, and the bonds between the individual layers therefore have to meet high requirements. A disadvantage of these belts is that fabric layers are required, which have an adverse effect on the procedure for making such belts continuous and on the intrinsic energy consumption and the production costs of the belt.

DE-A-40 39 584 describes a fabric-free drive belt or conveyor belt comprising an oriented polyamide sheet as a tension layer, which is provided on at least one side with an adhesion promoter coating, on which a rubber sheet is arranged as a rubber friction layer in the form of a laminate. The adhesion promoter coating consists, for example, of a water/alcohol-based solution containing at least 15% by weight, preferably 50% by weight, of resorcinol, and is intended to ensure that the adhesive strength requirements are met.

This fabric-free belt has the disadvantage that an adhesion promoter coating first has to be applied to the polyamide sheet and drying then carried out in order to produce the bond between the oriented polyamide sheet and the rubber sheet. Only thereafter is the bond formed under pressure and at a temperature between 140° C. and 190° C. Owing to the complex process engineering, however, it is difficult to achieve uniform adhesion. Consequently, this solution has not become established in the market.

DE-A-21 14 746 describes a process for the production of a flexible laminated material usable in a conveyor belt, in which a layer of an elastomeric material, which contains resorcinol and a compound becoming a methylene donator when heated, is applied to a polyamide film and subsequently the structure is heated. The resorcinol as well as the methylene donator are necessary to cause an adherence between the elastomeric material and the polyamide. Moreover, this process is not, without further difficulty applicable to an oriented polyamide layer because of its surface polarity, thereby rendering a wetting more difficult.

OBJECTS OF THE INVENTION

In view of the disadvantages of the known, above described belts and belt production processes the invention is based on the following object. A fabric-free belt is to be provided having an oriented polyamide layer as a tension layer. A thermoplastic layer, which essentially consists of polyetheramide block copolymers or copolyamides, or a rubber layer having as high an adhesive strength as possible is arranged on the polyamide layer in the form of a laminate. It is not necessary to apply an adhesion promoter coating to the oriented polyamide layer or the rubber layer or thermoplastic layer or to have a methylene donator for the production of the bond. The production of the fabric-free belt should be as economical as possible and said belt should have a long service life.

In the present invention, the polyamide layer is understood as meaning not only a layer of pure polyamides or polyamide blends but also a layer of polyamides or polyamide blends which have been given high impact tensile strength.

This object is achieved by the fabric-free belt according to the invention, and by the process, according to the invention, for the production of such a fabric-free belt.

SUMMARY OF THE INVENTION

The essential feature of the invention is that a rubber layer arranged on an oriented polyamide layer in the form of a laminate contains at least one part by weight of resorcinol, phenol, cresols or mixtures thereof, based on 100 parts by weight of rubber, or a thermoplastic layer arranged in the form of a laminate contains 5–30% by weight of resorcinol, phenol, cresols or mixtures thereof. The rubber layer or thermoplastic layer adheres without contribution of a methylene donator directly to the oriented polyamide layer which forms the tension layer of a fabric-free belt.

In the production of a fabric-free belt, at least one rubber blend or at least one thermoplastic is produced by mixing at least 1 part by weight of resorcinol, phenol, cresols or mixtures thereof with 100 parts by weight of rubber or 5–30% by weight of resorcinol, phenol, cresols or mixtures thereof with polyetheramide block copolymers or copolyamides—and further additives not essential for the invention—in conventional industrial mixing units, and at least one rubber layer or at least one thermoplastic layer is produced from said rubber blend or said thermoplastic in a known manner. This rubber or thermoplastic layer or these rubber or thermoplastic layers is or are then applied to an oriented polyamide layer and bonded therewith under pressure and at a temperature between 140° C. and 190° C. without contribution of a methylene donator.

The bond between the oriented polyamide layer and the rubber layer or thermoplastic layer has an adhesive strength which fully meets the high requirements with regard to drive belts or conveyor belts in wide application ranges.

Because no adhesion promoter coating has to be applied to produce the bond, a labor-intensive and time-consuming process and the risk of nonuniform application are dispensed with in the production of a fabric-free belt, leading to lower production costs. Furthermore, no solvent is required in order to be able to apply the actual adhesion-promoting substance, thus helping to protect the environment.

The bond between oriented polyamide layer and rubber layer or thermoplastic layer is produced at temperatures which are sufficiently low to prevent elimination of the orientation of the polyamide layer.

Belts according to the above description are distinguished by very durable final bonds and low intrinsic energy consumption, in particular at a high bending frequency.

BRIEF DESCRIPTION OF THE FIGURES

The fabric-free belt according to the invention and the process for the production of such a belt are described in more detail below with reference to the attached drawings and with reference to two embodiments. The drawings show the following.

DETAILED DESCRIPTION OF THE FIGURES

FIG. 1

The fabric-free belt according to the invention which is illustrated contains an oriented polyamide layer 1 which forms the tension layer of the belt and which imparts tensile strength. Polyamide 6, polyamide 66, polyamide 12 and mixtures thereof have proved to be materials suitable for the oriented polyamide layer.

Rubber layers 2, 3 are arranged in the form of a laminate on both sides of the oriented polyamide layer 1. Depending on the intended use, these rubber layers 2, 3 have a composition such that they fulfill the specific conditions for use as a drive belt or conveyor belt. In general, they must have in particular a certain aging resistance and abrasion resistance and a certain coefficient of friction.

Various rubber materials may be used as a base material for the production of rubber layers 2, 3 according to the invention. Nitrile rubber or carboxylated or hydrogenated nitrile rubber is preferably used. However, polychloroprene, butyl, ethylene/propylene, ethylene/propylene/diene, epichlorohydrin, polyurethane, butadiene, styrene/butadiene or natural rubber or chlorinated or chlorosulphonated polyethylene is also particularly suitable.

Resorcinol, phenol, cresols or mixtures thereof are mixed with the base material, in a dose of at least one part by weight, for example 10 parts by weight, based on 100 parts by weight of rubber, of resorcinol, phenol, cresols or mixtures thereof. The admixing of resorcinol, phenol, cresols or mixtures thereof makes it possible to bond the rubber layers 2, 3 directly to the oriented polyamide layer 1 without an additional adhesion promoter coating being required.

For the production of the fabric-free belt, the rubber layers 2, 3 are applied to the oriented polyamide layer 1 and bonded to it under pressure and at a temperature of from 140° C. to 190° C.

FIG. 2

Figure 1:
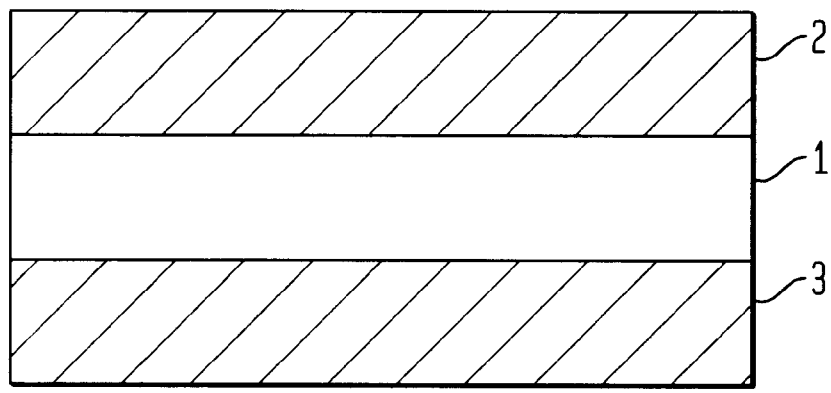
FIG. 1—a schematic cross-sectional view of a first embodiment of a fabric-free belt according to the invention and FIG. 2—a schematic cross-sectional view of a second embodiment of a fabric-free belt according to the invention.
Figure 2:
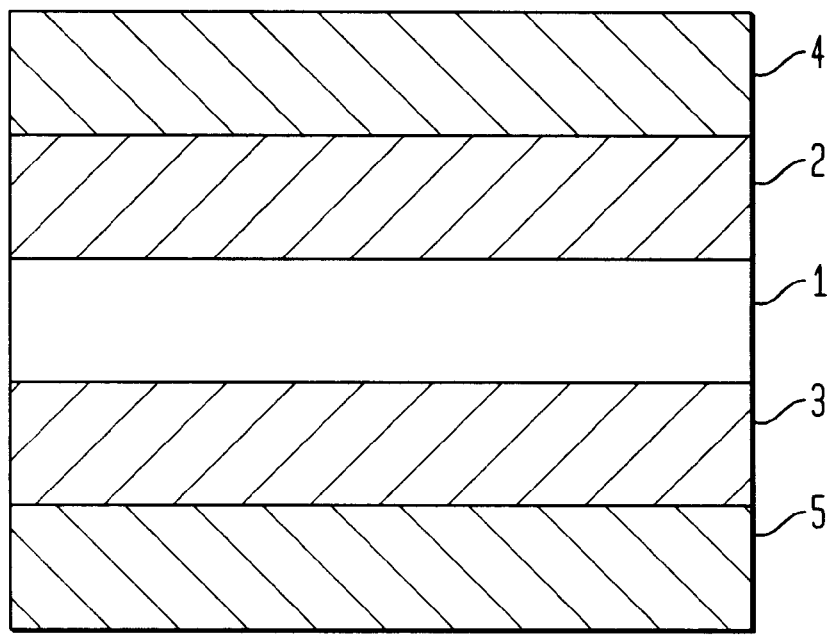

Rubber or thermoplastic layers 2, 3 which contain at least 1 part by weight, for example 10 parts by weight, based on 100 parts by weight of rubber, of resorcinol, phenol, cresols or mixtures thereof, or at least 5–30% by weight, for example 20% by weight, of resorcinol, phenol, cresols or mixtures thereof, are arranged on both sides of the oriented polyamide layer 1 forming the tension layer. Once again, the rubber materials mentioned in the embodiment described in connection with FIG. 1 may be used as base material for the rubber layers. The thermoplastic layers may consist of polyetheramide block copolymers or copolyamides. In the present embodiment, however, the rubber or thermoplastic layers 2, 3 do not form the outermost belt layers but only intermediate layers. They therefore have a composition such that they have optimum adhesion to the oriented polyamide layer 1 without it being necessary to take into account the abrasion resistance or the coefficient of friction.

Rubber friction layers 4, 5 are present on those sides of the rubber or thermoplastic layers 2, 3 which face away from the oriented polyamide layer 1. The friction layers 4, 5, depending on the intended use, have a known composition such that they fulfill the specific conditions for use as a drive belt or conveyor belt. The friction layers 4, 5 of the first embodiment may consist of the same rubber as the rubber layers 2, 3 or of a different rubber. In general, they must have in particular a certain aging resistance and abrasion resistance and a certain coefficient of friction. Adhesion to the corresponding rubber or thermoplastic layers 2, 3 which meets the requirements is ensured by the resorcinol, phenol, cresol or mixtures thereof mixed with said layers. Here too, the laminate is produced under pressure and at a temperature of from 140° C. to 190° C.

Further design variations of the fabric-free belts described above can be realized. The following may also be expressly mentioned here:

The layer structure of the fabric-free layer may also be asymmetrical. For example, a structure comprising rubber layer—oriented polyamide layer—rubber layer—friction layer or also rubber layer—oriented polyamide layer—thermoplastic layer—friction layer is possible, so that the outermost belt layer is formed on one side by a resorcinol-, phenol- or cresol-containing rubber layer and on the other side by a friction layer.

The fabric-free belt may have additional layers which are arranged outside the laminate comprising rubber layer or thermoplastic layer—oriented polyamide layer.

We claim:

1. A multiple layer fabric-free belt, comprising:
   an oriented polyamide layer as a tension layer; and
   a thermoplastic layer arranged on at least one side of said polyamide layer and laminated directly to said polyamide layer so as to form a methylene donator-free bond between said polyamide layer and said thermoplastic layer, said thermoplastic layer including polyetheramide block copolymers and 5–30% by weight of a material selected from the group consisting of resorcinol, phenol, cresols, and mixtures thereof.

2. A multiple layer fabric-free belt according to claim 1, wherein said thermoplastic layer contains 15–25% by weight of a material selected from the group consisting of resorcinol, phenol, cresols, and mixtures thereof.

3. A multiple layer fabric-free belt according to claim 1, further comprising a rubber friction layer arranged on the side of said laminate layer facing away from said polyamide layer.

4. A multiple layer fabric-free belt, comprising:
   an oriented polyamide layer as a tension layer; and
   a thermoplastic layer arranged on at least one side of said polyamide layer and laminated directly to said polyamide layer so as to form a methylene donator-free bond between said polyamide layer and said thermoplastic layer, said thermoplastic layer including copolyamides and 5–30% by weight of a material selected from the group consisting of resorcinol, phenol, cresols, and mixtures thereof.

5. A multiple layer fabric-free belt according to claim 4, wherein said thermoplastic layer contains 15–25% by weight of a material selected from the group consisting of resorcinol, phenol, cresols, and mixtures thereof.

6. A multiple layer fabric-free belt according to claim 4, further comprising a rubber friction layer arranged on the side of said laminate layer facing away from said polyamide layer.

7. A multiple layer fabric-free belt, comprising:
   an oriented polyamide layer as a tension layer; and
   a rubber layer arranged on at least one side of said polyamide layer and laminated directly to said polyamide layer so as to form a methylene donator-free bond between said polyamide layer and said rubber layer, said rubber layer including at least one part by weight of a material selected from the group consisting of resorcinol, phenol, cresols, and mixtures thereof, based on 100 parts by weight of rubber.

8. A multiple layer fabric-free belt according to claim 7, wherein said rubber layer contains between 5 and 15 parts by weight of a material selected from the group consisting of resorcinol, phenol, cresols, and mixtures thereof, based on 100 parts by weight of rubber.

9. A multiple layer fabric-free belt according to claim 7, wherein said rubber layer contains rubber selected from the group consisting of nitrile rubber, carboxlyated nitrile rubber, and hydrogenated nitrile rubber.

10. A multiple layer fabric-free belt according to claim 7, wherein said rubber layer contains material selected from the group consisting of polychloroprene, butyl, ethylene/propylene, ethylene/propylene/diene, epichlorohydrin, polyurethane, butadiene, styrene/butadiene, natural rubber, chlorinated polyethylene, and chlorosulphonated polyethylene.

11. A multiple layer fabric-free belt according to claim 7, wherein said rubber layer is the outermost belt layer.

12. A multiple layer fabric-free belt according to claims 1, 4, or 7, wherein said polyamide layer includes a polyamide selected from the group consisting of polyamide 6, polyamide 66, and polyamide 12.

13. A multiple layer fabric-free belt according to claims 1 or 4, wherein said thermoplastic layer is arranged on each of two sides of said polyamide layer.

14. A multiple layer fabric-free belt according to claims 1, 4, or 7, wherein said belt is a drive belt.

15. A multiple layer fabric-free belt according to claims 1, 4, or 7, wherein said belt is a conveyor belt.

16. A process for producing a multiple layer fabric-free belt, comprising the steps of:

producing a rubber layer by mixing between one and fifteen parts by weight of a material selected from the group consisting of resorcinol, phenol, cresols, and mixtures thereof with 100 parts by weight of rubber;

applying said rubber layer to an oriented polyamide layer; and bonding said rubber layer to said polyamide layer under pressure and at a temperature between 140° C. and 190° C. so as to form a methylene donator-free bond between said rubber layer and said polyamide layer.

17. A process for producing a multiple layer fabric-free belt, comprising the steps of:

producing a thermoplastic layer by mixing 5–30% by weight of a material selected from the group consisting of resorcinol, phenol, cresols, and mixtures thereof with polyetheramide block copolymers;

applying said thermoplastic layer to an oriented polyamide layer; and bonding said thermoplastic layer to said polyamide layer under pressure and at a temperature between 140° C. and 190° C. so as to form a methylene donator-free bond between said thermoplastic layer and said polyamide layer.

18. A process for producing a multiple layer fabric-free belt, comprising the steps of:

producing a thermoplastic layer by mixing 5–30% by weight of a material selected from the group consisting of resorcinol, phenol, cresols, and mixtures thereof with copolyamides;

applying said thermoplastic layer to an oriented polyamide layer; and bonding said thermoplastic layer to said polyamide layer under pressure and at a temperature between 140° C. and 190° C. so as to form a methylene donator-free bond between said thermoplastic layer and said polyamide layer.

19. A multiple layer fabric-free belt according to claim 7, wherein said rubber layer is arranged on each of two sides of said polyamide layer.

* * * * *